United States Patent [19]
Murdock et al.

[11] Patent Number: 5,661,524
[45] Date of Patent: Aug. 26, 1997

[54] METHOD AND APPARATUS FOR MOTION ESTIMATION USING TRAJECTORY IN A DIGITAL VIDEO ENCODER

[75] Inventors: John Ashley Murdock, Apalachin; Agnes Yee Ngai, Endwell; Everett George Vail, III, Binghamton, all of N.Y.

[73] Assignee: International Business Machines Corporation, Armonk, N.Y.

[21] Appl. No.: 612,639

[22] Filed: Mar. 8, 1996

[51] Int. Cl.⁶ .................................................. H04N 7/32
[52] U.S. Cl. .................................... 348/416; 348/699
[58] Field of Search ............................. 348/416, 699, 348/700, 701, 402, 415, 409, 401, 400, 390, 384; 382/236, 238, 232; H04N 7/137

[56] References Cited

U.S. PATENT DOCUMENTS

| | | | |
|---|---|---|---|
| 4,679,086 | 7/1987 | May | 348/620 |
| 5,151,784 | 9/1992 | Lavagetto et al. | 348/416 |
| 5,200,820 | 4/1993 | Gharavi | 348/699 |
| 5,355,378 | 10/1994 | Ohta | 371/53 |
| 5,361,105 | 11/1994 | Iu | 348/699 |
| 5,367,343 | 11/1994 | Blair | 348/700 |
| 5,438,374 | 8/1995 | Yan | 348/620 |
| 5,473,379 | 12/1995 | Horne | 348/699 |

*Primary Examiner*—Amelia Au
*Assistant Examiner*—Bryan S. Tung
*Attorney, Agent, or Firm*—Richard M. Goldman

[57] ABSTRACT

Method and apparatus for calculating motion vectors. The method and apparatus calculate a motion trajectory value and initial base weights such that when x is the horizontal offset of the current macroblock from the left edge of the search window, and y is the vertical offset of the current macroblock from the top edge of the search window, and this pair of x and y values are used as the initial base weights, the motion estimation provides the best matched macroblock that has the shortest distance from the current macroblock. When the initial base weights are set to 0's, then the motion estimation will produce the first best matched macroblock encountered by the search circuitry. A scheme is also provided to set the initial base weights so that the best matched macroblock closest to the motion trajectory is selected for the motion estimation.

4 Claims, 7 Drawing Sheets

PREVIOUS PICTURE AFTER USING MOTION VECTORS TO ADJUST BLOCK POSITIONS.

BLOCKS OF PREVIOUS PICTURE USED TO PREDICT NEW PICTURE.

PROCESSING THROUGH A SEARCH WINDOW FOR A 4X4 BLOCK. THE SEARCH WINDOW SIZE IS +/-2 IN THE HORIZONTAL AND VERTICAL DIRECTIONS. THERE ARE 5 POSSIBLE HORIZONTAL POSITIONS PER LINE AND 5 VERTICAL LINES FOR A TOTAL OF 25 POSSIBLE BEST MATCH LOCATIONS.

THE * INDICATES THE POSITION OF THE UPPER LEFT PIXEL OF THE CURRENT BLOCK AROUND WHICH THE SEARCH WINDOW IS FORMED.

1st SEARCH LOCATION

2nd SEARCH LOCATION

17th SEARCH LOCATION

18th SEARCH LOCATION

FIG.6

FIG.7

METHOD AND APPARATUS FOR MOTION ESTIMATION USING TRAJECTORY IN A DIGITAL VIDEO ENCODER

FIELD OF THE INVENTION

The invention relates to compression of digital visual images, and more particularly to temporal compression, that is reduction of redundancy between pictures. Redundancy between pictures is reduced, or even eliminated, through the use of motion vectors. More particularly, the invention relates to motion estimation with averaging or biasing which helps eliminate discontinuities and jerkiness, and improves compression.

BACKGROUND OF THE INVENTION

Within the past decade, the advent of world-wide electronic communications systems has enhanced the way in which people can send and receive information. In particular, the capabilities of real-time video and audio systems have greatly improved in recent years. In order to provide services such as video-on-demand and video conferencing to subscribers, an enormous amount of network bandwidth is required. In fact, network bandwidth is often the main inhibitor to the effectiveness of such systems.

In order to overcome the constraints imposed by networks, compression systems have emerged. These systems reduce the amount of video and audio data which must be transmitted by removing redundancy in the picture sequence. At the receiving end, the picture sequence is uncompressed and may be displayed in real-time.

One example of an emerging video compression standard is the Moving Picture Experts Group ("MPEG") standard. Within the MPEG standard, video compression is defined both within a given picture and between pictures. Video compression within a picture is accomplished by conversion of the digital image from the time domain to the frequency domain by a discrete cosine transform, quantization, variable length coding, and Huffman coding. Video compression between pictures is accomplished via a process referred to as motion estimation, in which a motion vector is used to describe the translation of a set of picture elements (pels) from one picture to another.

OBJECTS OF THE INVENTION

It is a primary object of the invention to provide a method of searching for a best match macroblock in a previous picture that produces a motion vector between the best match macroblock in the previous picture and the macroblock in the current picture such that the motion vector between the two macroblocks is close to the actual motion trajectory between the two macroblocks.

It is a further object of the invention to provide improved inter-picture compression.

SUMMARY OF THE INVENTION

These and other objectives of the invention are attained through the methods and apparatus of the invention.

The basic motion estimation unit under the MPEG2 standard is the macroblock. A macroblock, defined as a block of 16×16 pixels, is a very small segment of a picture. When such a small segment is mapped against a relatively large search window, there will often be several macroblocks in the reference picture that have the same prediction difference, or very similar prediction differences. In this circumstance, the encoder must determine the real best match macroblock in the reference picture. The "prediction difference" is the sum of the absolute value of the differences between the corresponding individual pixels in the current macroblock and the reference picture macroblock, that is, $$\sum_{i=0}^{i=15}\sum_{j=0}^{j=15} |c_{i,j} - r_{i,j}|$$

where $c_{i,j}$ is the pixel value of the i,j pixel in the current picture macroblock, and $r_{i,j}$ is the pixel value of the corresponding i,j pixel in the reference picture macroblock. According to a preferred embodiment, motion estimation is carried out from the top pixel to the bottom pixel, and from the left column to the right column, that is, in an orderly fashion. In the case where the lowest prediction difference is obtained in more then one reference macroblock, the best match macroblock could be the one first calculated by the system, the one that produces the shortest distance from the current macroblock, or the one that is closest to a motion path. Since motion can be in different directions, selection of the macroblock first calculated represents a random decision, while the selection of the closest macroblock can produce a good result. However, for the flexible encoder of our invention, a scheme is used that can select motions based on trajectory.

According to the method and apparatus of the invention, motion trajectory values and base weights can be calculated by the on chip circuitry of the encoder or by microcode, and different base weights can be set into the circuitry. A motion trajectory value from the previous picture indicates the direction and the amount of motion to be expected in the current picture. The previous average motion vector, which is the average of the motion vectors for all the macroblocks in the previous picture is one example of a motion trajectory value. The search window is determined as if the current macroblock is placed in the center of it. The window is smallest along the edges of a picture. There are two components in a motion vector, an x or horizontal component, and a y or vertical component. x is the horizontal displacement or movement from the current macroblock position, and y is the vertical displacement or movement from the current macroblock position. If the motion is to the right of the current macroblock then the value of x is positive. If the motion is to the south of the current macroblock then the value of y is positive. If the average motion vector (x,y) of the previous picture are negatives, then the base weight is calculated to bias favorably towards the upper left hand corner of the picture. There are two components in the base weight, one for horizontal and one for vertical. The initial base weight is directly applied to the upper left hand corner of the window. The base weight is adjusted by the variable unit weight, typically ±1, for each vertical or horizontal pel distance away from the initial position. The base weight will be 0 at the location of the motion trajectory value.

Let x be the horizontal offset of the current macroblock from the left edge of the search window, and y be the vertical offset of the current macroblock from the top edge of the search window. When this pair of x and y values are used as the base weights, the motion estimation will provide the best matched macroblock that has the shortest distance from the current macroblock. When the base weights are set to 0's, then the motion estimation will produce the first best matched macroblock encountered by the search circuitry.

THE FIGURES

The invention may be more clearly understood by reference to the Figures appended hereto.

DETAILED DESCRIPTION OF THE INVENTION

The invention relates to MPEG and HDTV compliant encoders and encoding processes and more particularly to motion estimation with averaging and/or biasing. The averaging and the biasing helps eliminate discontinuities and jerkiness, and improves compression. The encoding functions performed by the encoder include data input, spatial compression, motion estimation, macroblock mode generation, data reconstruction, entropy coding, and data output. Motion estimation and compensation are the temporal compression functions. They are repetitive functions with high computational requirements, and they include intensive reconstructive processing, such as inverse discrete cosine transformation, inverse quantization, motion compensation, and especially searching for best match macroblocks between pictures displaced in time from one another.

More particularly the invention relates to motion estimation, compensation, and prediction, and even more particularly to the search for best match macroblocks and the subsequent calculation of motion vectors. Motion compensation exploits temporal redundancy by dividing the current picture into blocks, for example, macroblocks, and then searching in previously transmitted pictures for a nearby block with similar content. Only the difference between the current block pels and the predicted block pels extracted from the reference picture is actually compressed for transmission and thereafter transmitted.

The simplest method of motion compensation and prediction is to record the luminance and chrominance, i.e., intensity and color, of every pixel in an "I" picture, then record changes of luminance and chrominance, i.e., intensity and color for every specific pixel in the subsequent picture. However, this is uneconomical in transmission medium bandwidth, memory, processor capacity, and processing time because objects move between pictures, that is, pixel contents move from one location in one picture to a different location in a subsequent picture. A more advanced idea is to use a previous or subsequent picture to predict where a block of pixels will be in a subsequent or previous picture or pictures, for example, with motion vectors, and to write the result as "predicted pictures" or "P" pictures. More particularly, this involves making a best estimate or prediction of where the pixels or macroblocks of pixels of the $i^{th}$ picture will be in the $i-1^{th}$ or $i+1^{th}$ picture. It is one step further to use both subsequent and previous pictures to predict where a block of pixels will be in an intermediate or "B" picture.

Figure 2:
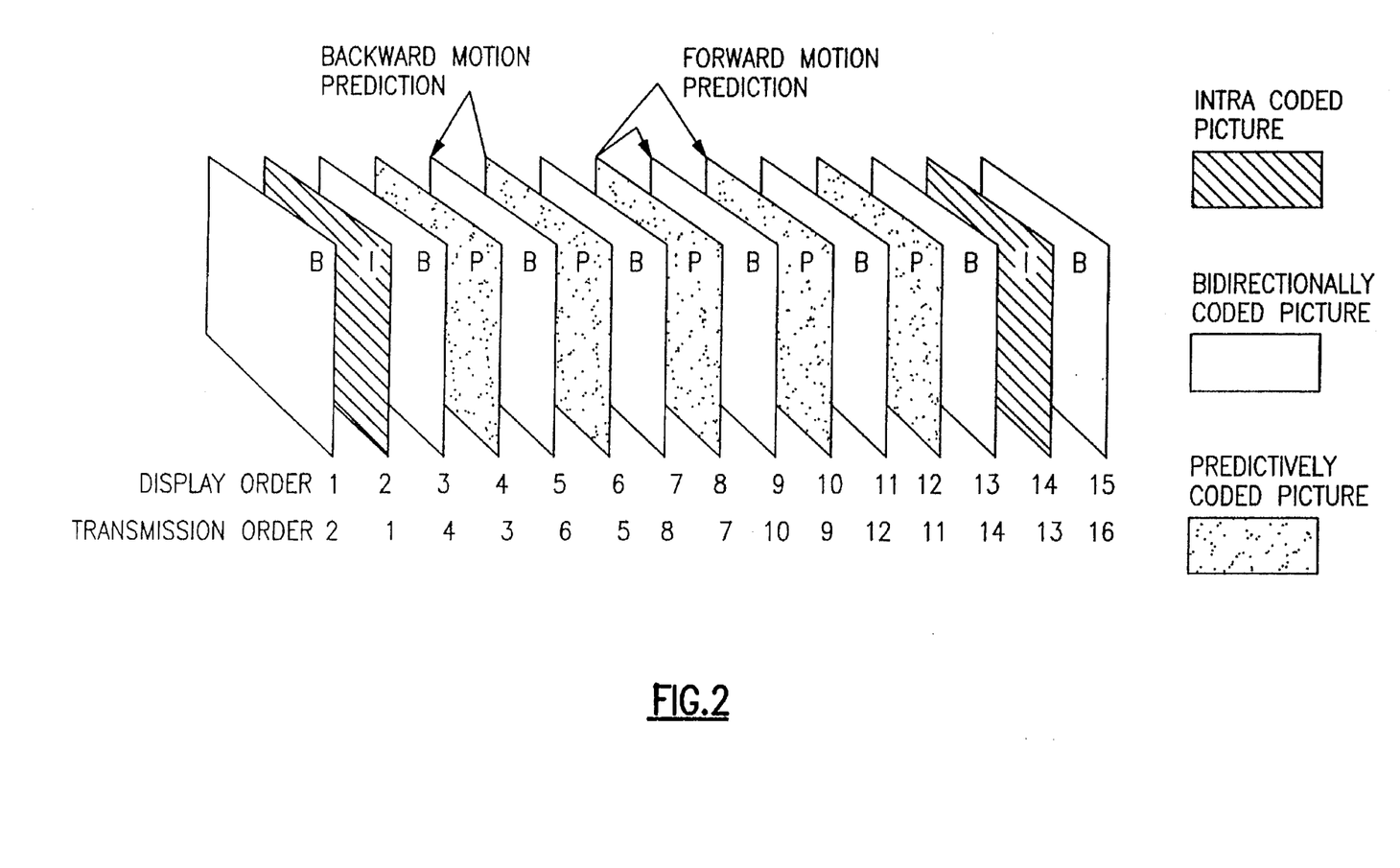
FIG. 2 illustrates the I, P, and B pictures, examples of their display and transmission orders, and forward, and backward motion prediction.

To be noted is that the picture encoding order and the picture transmission order do not necessarily match the picture display order. This is illustrated in FIG. 2. For I-P-B systems, that is, intra-predicted-bidirectional picture systems, the input picture transmission order is different from the encoding order, and the input pictures must be temporarily stored until used for encoding. A buffer stores this input until it is used.

Figure 1:
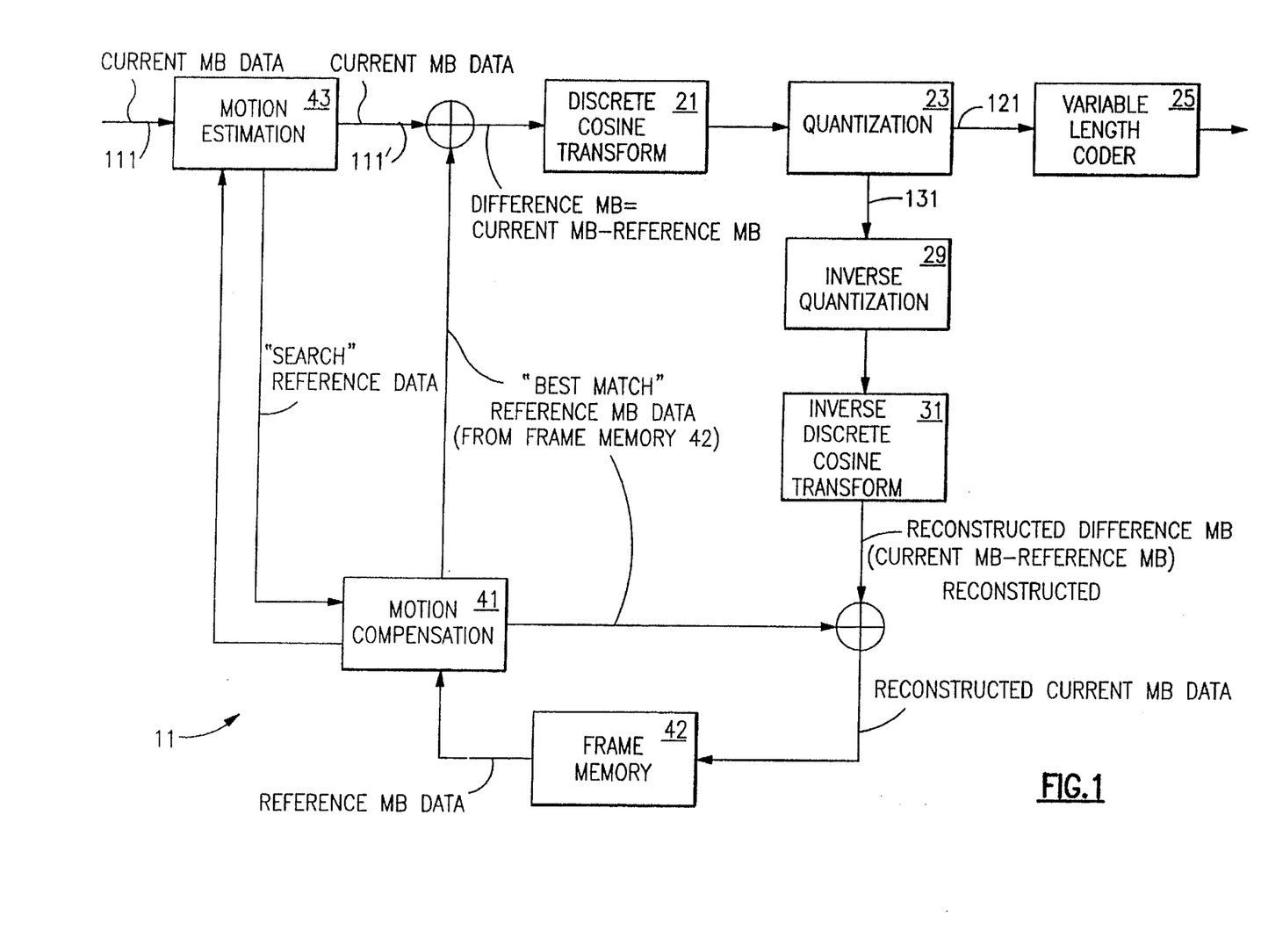
FIG. 1 shows a flow diagram of a generalized MPEG2 compliant encoder 11, including a discrete cosine transformer 21, a quantizer 23, a variable length coder 25, an inverse quantizer 29, an inverse discrete cosine transformer 31, motion compensation 41, frame memory 42, and motion estimation 43. The data paths include the $i^{th}$ picture input 111, difference data 112, motion vectors 113 the picture output 121, the feedback picture for motion estimation and compensation 131, and the motion compensated picture 101. This FIGURE has the assumptions that the $i^{th}$ pictures exists in Frame Memory or Frame Store 42, and that the $i+1^{th}$ picture is being encoded with motion estimation.

For purposes of illustration, a generalized flow chart of MPEG compliant encoding is shown in FIG. 1. In the flow chart the images of the $i^{th}$ picture and the $i+1^{th}$ picture are processed to generate motion vectors. The motion vectors predict where a macroblock of pixels will be in a prior and/or subsequent picture. The use of the motion vectors instead of full images is a key aspect of temporal compression in the MPEG and HDTV standards. As shown in FIG. 1 the motion vectors, once generated, are used for the translation of the macroblocks of pixels, from the $i^{th}$ picture to the $i+1^{th}$ picture.

As shown in FIG. 1, in the encoding process, the images of the $i^{th}$ picture and the $i+1^{th}$ picture are processed in the encoder 11 to generate motion vectors which are the form in which, for example, the $i+1^{th}$ and subsequent pictures are encoded and transmitted. An input image 111 of a subsequent picture goes to the Motion Estimation unit 43 of the encoder. Motion vectors 113 are formed as the output of the Motion Estimation unit 43. These vectors are used by the Motion Compensation Unit 41 to retrieve macroblock data from previous and/or future pictures, referred to as "reference" data, for output by this unit. One output of the Motion Compensation Unit 41 is negatively summed with the output from the Motion Estimation unit 43 and goes to the input of the Discrete Cosine Transformer 21. The output of the Discrete Cosine Transformer 21 is quantized in a Quantizer 23. The output of the Quantizer 23 is split into two outputs, 121 and 131; one output 121 goes to a downstream element 25 for further compression and processing before transmission, such as to a run length encoder; the other output 131 goes through reconstruction of the encoded macroblock of pixels for storage in Frame Memory 42. In the encoder shown for purposes of illustration, this second output 131 goes through an inverse quantization 29 and an inverse discrete cosine transform 31 to return a lossy version of the difference macroblock. This data is summed with the output of the Motion Compensation unit 41 and returns a lossy version of the original picture to the Frame Memory 42.

As shown in FIG. 2, there are three types of pictures. There are "Intra pictures" or "I" pictures which are encoded and transmitted whole, and do not require motion vectors to be defined. These "I" pictures serve as a source of motion vectors. There are "Predicted pictures" or "P" pictures which are formed by motion vectors from a previous picture and can serve as a source of motion vectors for further pictures. Finally, there are "Bidirectional pictures" or "B" pictures which are formed by motion vectors from two other pictures, one past and one future, and can not serve as a source of motion vectors. Motion vectors are generated from "I" and "P" pictures, and are used to form "P" and "B" pictures.

Figure 3:
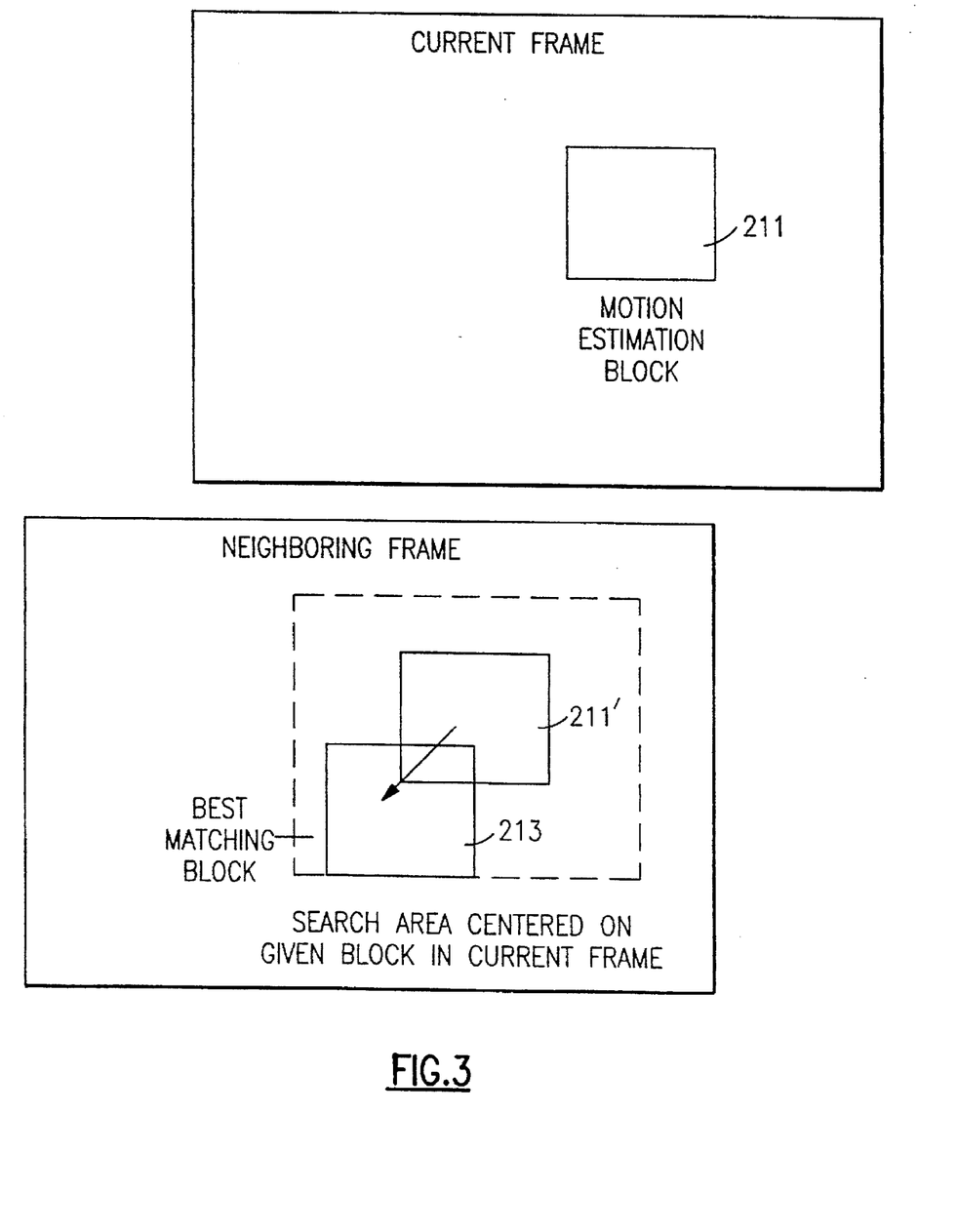
FIG. 3 illustrates the search from the motion estimation block in the current frame or picture to the best matching block in subsequent or previous frame or picture. Elements 211 and 211' represent the same location in both pictures.
Figure 4:
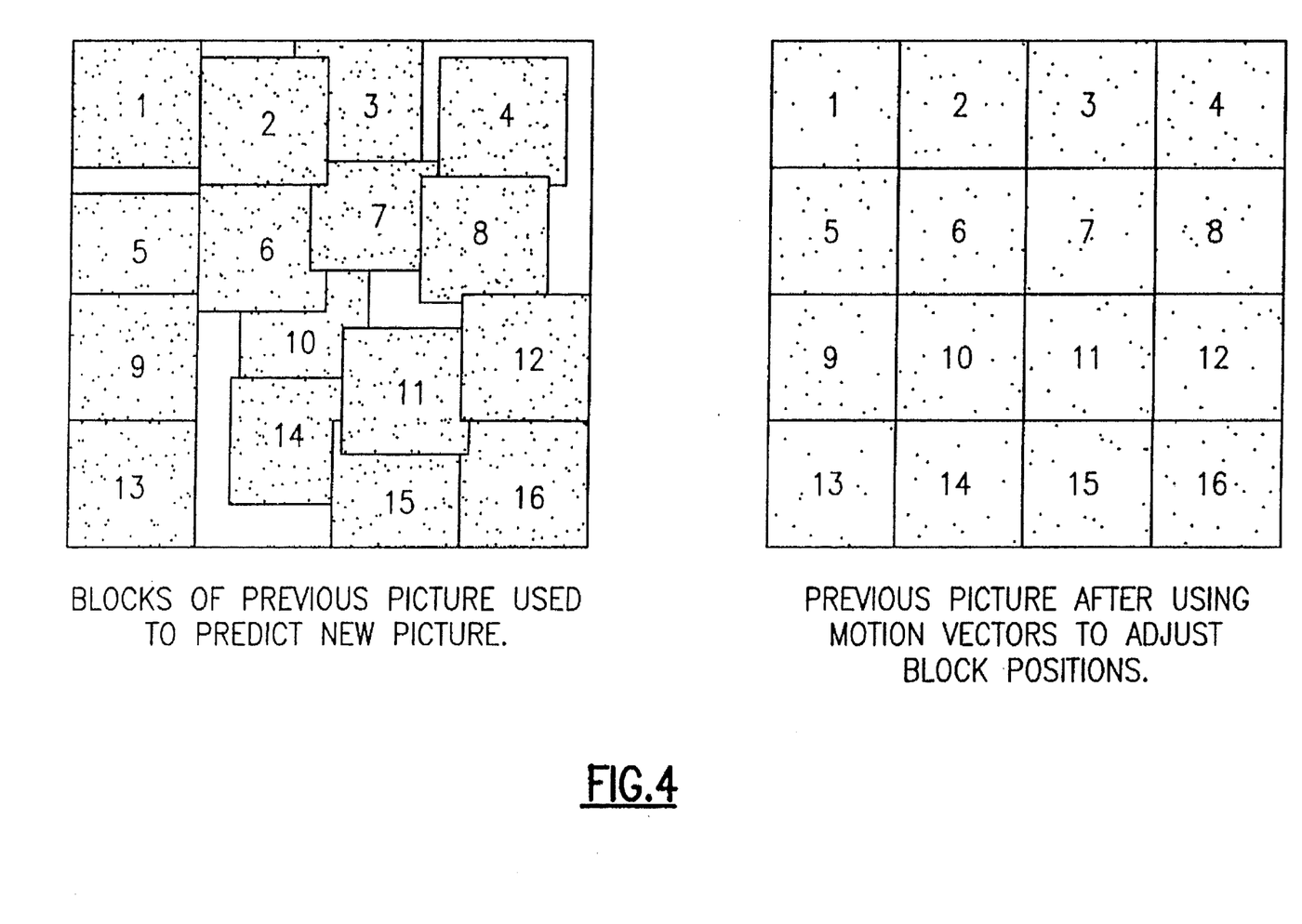
FIG. 4 illustrates the movement of blocks in accordance with the motion vectors from their position in a previous picture to a new picture, and the previous picture's blocks adjusted after using motion vectors.

One method by which motion estimation is carried out, shown in FIG. 3, is by a search from a macroblock 211 of an $i^{th}$ picture throughout a region of the next picture to find the best match macroblock 213. Translating the macroblocks in this way yields a pattern of macroblocks for the $i+1^{th}$ picture, as shown in FIG. 4. In this way the $i^{th}$ picture is changed a small amount, e.g., by motion vectors and difference data, to generate the $i+1^{th}$ picture. What is encoded are the motion vectors and difference data, and not the $i+1^{th}$ picture itself. Motion vectors translate position of an image from picture to picture, while difference data carries changes in chrominance, luminance, and saturation, that is, changes in shading and illumination.

Returning to FIG. 3, we look for a good match by starting from the same location in the $i^{th}$ picture as in the $i+1^{th}$ picture. A search window is created in the $i^{th}$ picture. We search for a best match within this search window. Once found, the best match motion vectors for the macroblock are coded. The coding of the best match macroblock includes a motion vector, that is, how many pixels in the y direction and how many pixels in the x direction is the best match displaced in the next picture. Also encoded is difference data, also referred to as the "prediction error", which is the difference in chrominance and luminance between the current macroblock and the best match reference macroblock.

As described above, video motion estimation in time domain compression of digital images relies upon motion vectors of the image from a position (pixel or macroblock) $x_1,y_1$ in one frame to a position (pixel or macroblock) $xd_2,y_2$ in the next frame. The motion estimation algorithm and apparatus find a set of motion vectors which correctly define the translations of the objects from frame to frame.

The motion estimation algorithm and apparatus find a "current frame" block of pixels (a macroblock) that approximately matches a "previous frame" or "reference" block of pixels (a macroblock). This is done by minimizing the "prediction difference." An absolute accumulated pixel or macroblock difference, i.e., a prediction difference, as defined above, is calculated for every reference macroblock in the search window. Now, in some cases, there will be one reference macroblock with a significantly lower prediction difference than the rest of the macroblocks. That macroblock is selected for motion estimation, i.e., for the tail of the motion vector. The x and y vectors map the movement of the image across the screen. One problem is that the displaced macroblock may not be the trajectory of true motion in the video. This could be due to intensity changes, noise, zooming, scaling, fast motion, or some other anomaly introduced by the camera or the system. As result the motion trajectory computed by the motion estimation algorithm will have an irregular behavior at some segments of the video image sequence.

In order to smooth out the motion trajectory and improve compression the method of the invention favors the generation of "similar" motion vectors between neighboring macroblocks. This is accomplished by inserting "base weights" in the calculation. The base weights have a biasing effect on the frame to frame motion correspondences. "Base weights" are described hereinabove.

Since motion vectors are coded differentially, it is beneficial to choose reference macroblocks with the same or similar motion vectors, provided that the accumulated absolute pixel difference is reasonably close to the lowest difference in the search window. Using a motion trajectory value such as the previous average motion vector and base weights, this can be accomplished.

The previous average motion vector is the average of the motion vectors for all the macroblocks in the previous picture. The previous average motion vector is broken into a horizontal and a vertical component, and the components can, independently have either positive or negative values. The initial base weight is a number that is set based on the previous average motion vector and the size of the search window. The base weights are adjusted for each location in the search window. The algorithm used in the method and apparatus of the invention starts from a calculation of a "previous average motion vector" which is the average of all of the motion vectors of all of the macroblocks in the previous frame. The second starting point is an "initial base weight" which is a function of the "previous average motion vector" and the size of the search window, as shown in Table 1.

The initial values for the base weights are set so that the value of the base weights at the position corresponding to the "previous average motion vector" are zero. The procedure for adjusting these base weights is that after the initial value is set, the base weights are decremented until the base weight is 0, then incremented. In the motion estimation circuitry adders are installed for horizontal incrementation/decrementation and for vertical incrementation/decrementation. As the motion calculation proceeds from one macroblock unit to the next the values of the base weights are incremented/decremented by the unit weight value and added to the prediction difference. The further the position is from the previous average motion vector, the larger the base weights are which get added to the accumulated pixel difference. This has the desired effect of biasing towards the position corresponding to the previous average motion vector.

The base weights are used to select from the set of macroblocks having approximately equal prediction differences. This is because in many cases there will be more than one macroblock with the lowest prediction difference, or even a plurality of macroblocks which are close to the lowest prediction difference. In this situation it is not clear which reference macroblock is the best candidate to be used for motion estimation. According to the invention the base weight is added to each macroblock's prediction difference. This base weight is proportional to the displacement of the candidate reference macroblock from the known motion trajectory.

The method of the invention provides flexibility by the use of a variable or preset unit weight value. A unit weight value is the amount that the base weight is incremented or decremented when the reference macroblock location is moved by one position. By changing the unit weight value, the amount of biasing can be adjusted. Increasing the unit weight biases the results more strongly in favor of the motion trajectory position since the larger base weights are added to prediction differences located further away from the motion trajectory.

Table 1, below, shows how the previous average motion vector and base weights are used. In the table only the horizontal direction is illustrated. It is, of course, to be understood that the vertical method follows similarly.

In Table 1 the following variables are used:
j=magnitude of search window size (for ±8, j=8)
m=magnitude of average motion vector
w=initial base weight
u=unit weight value (u=1)
Four cases are handled.

TABLE 1

|  | M | j | w |
|---|---|---|---|
| Case 1: Negative average motion vector (m ≤ j), initial base weight (w = j − m) | 3 | 8 | 5 |
| Case 2: negative average motion vector (m > j), initial base weight (w = 0) | 12 | 8 | 0 |
| Case 3a: positive average motion vector (m ≤ j), initial base weight (w = m + j) | 2 | 8 | 10 |
| Case 3b: positive average motion vector (m > j), initial base weight (w = m + j) | 11 | 8 | 19 |

Figure 5:
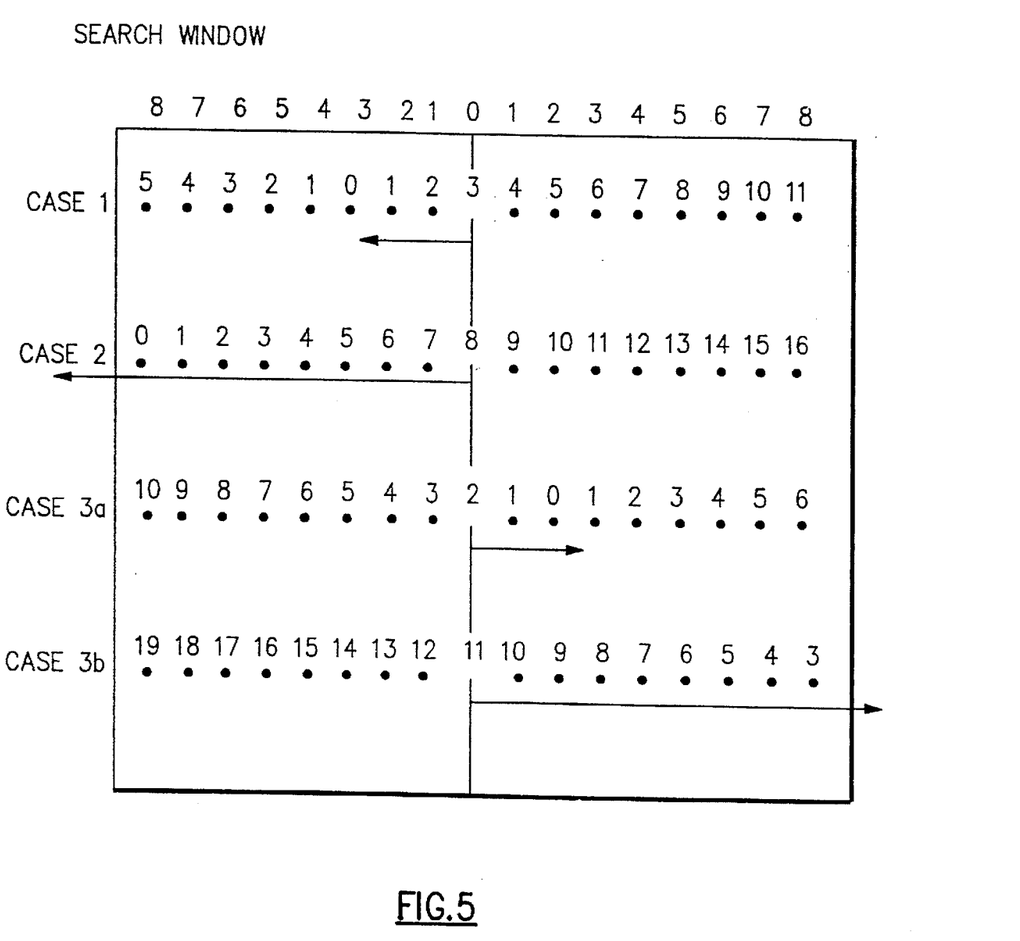
FIG. 5 is a representation of how macroblock base weights are adjusted across the search window for the cases of negative and positive average motion vector components.

The diagram in FIG. 5 illustrates how the base weights are adjusted across the search window for each case shown in Table 1.

Figure 6:
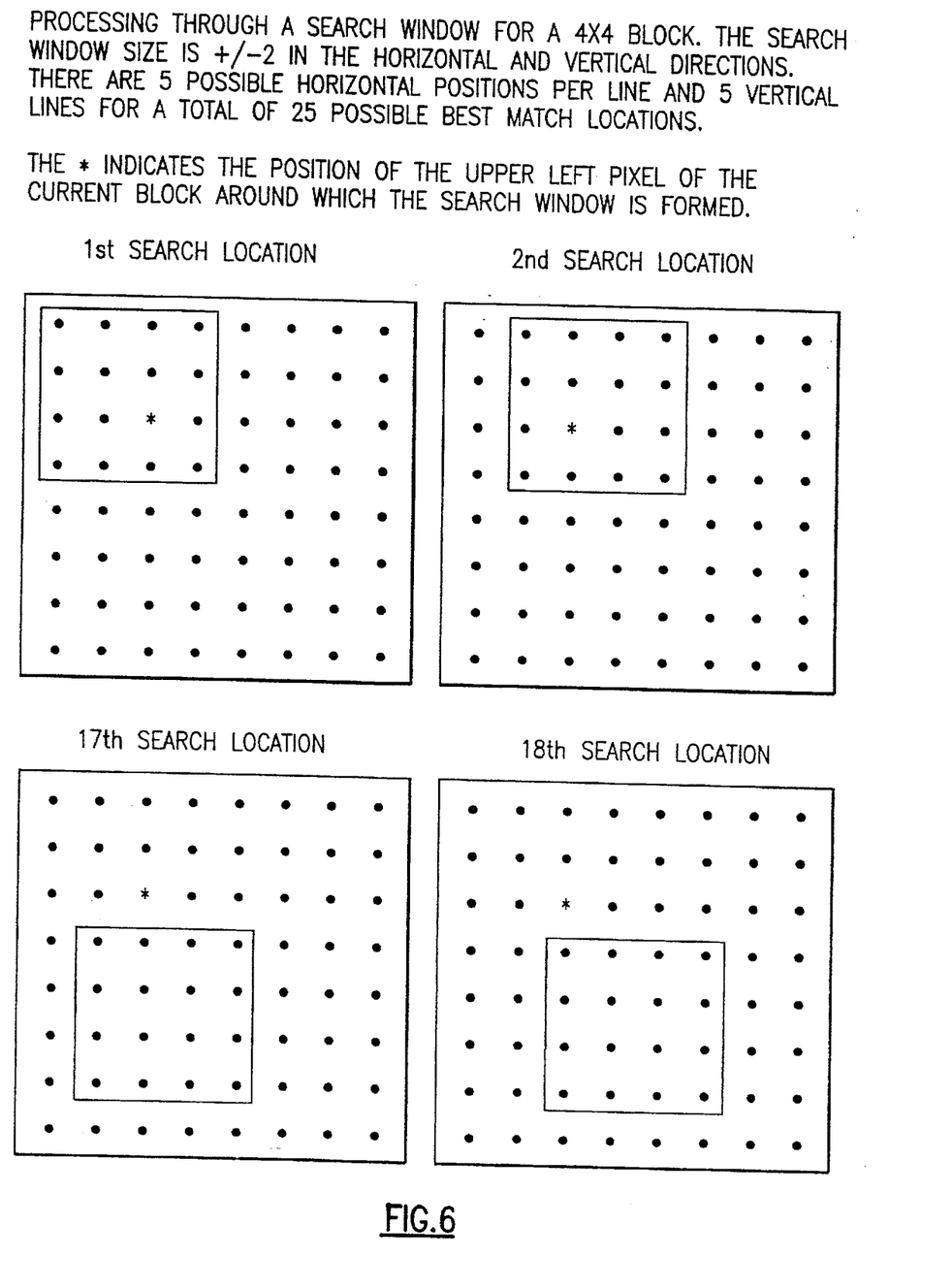
FIG. 6 is a representation of how a search strategy is carried out for the best match macroblock for four exemplary searches out of twenty five searches. The asterisk indicates the position of the upper left pixel of the current block around which the search window is formed. Illustrated is processing through a 4×4 block. The illustrated search window size is ±2 in the horizontal and vertical directions. As illustrated, there are five possible horizontal positions per line and five possible vertical line positions, for a total of twenty five possible best match locations.

FIG. 6 is a representation of how a search strategy is carried out for the best match macroblock for four exemplary searches out of twenty five searches. The asterisk indicates the position of the upper left pixel of the current block around which the search window is formed. Illustrated is processing through a 4×4 block. The illustrated search window size is ±2 in the horizontal and vertical directions. As illustrated, there are five possible horizontal positions per line and five possible vertical positions per line, for a total of twenty five possible best match locations.

Figure 7:
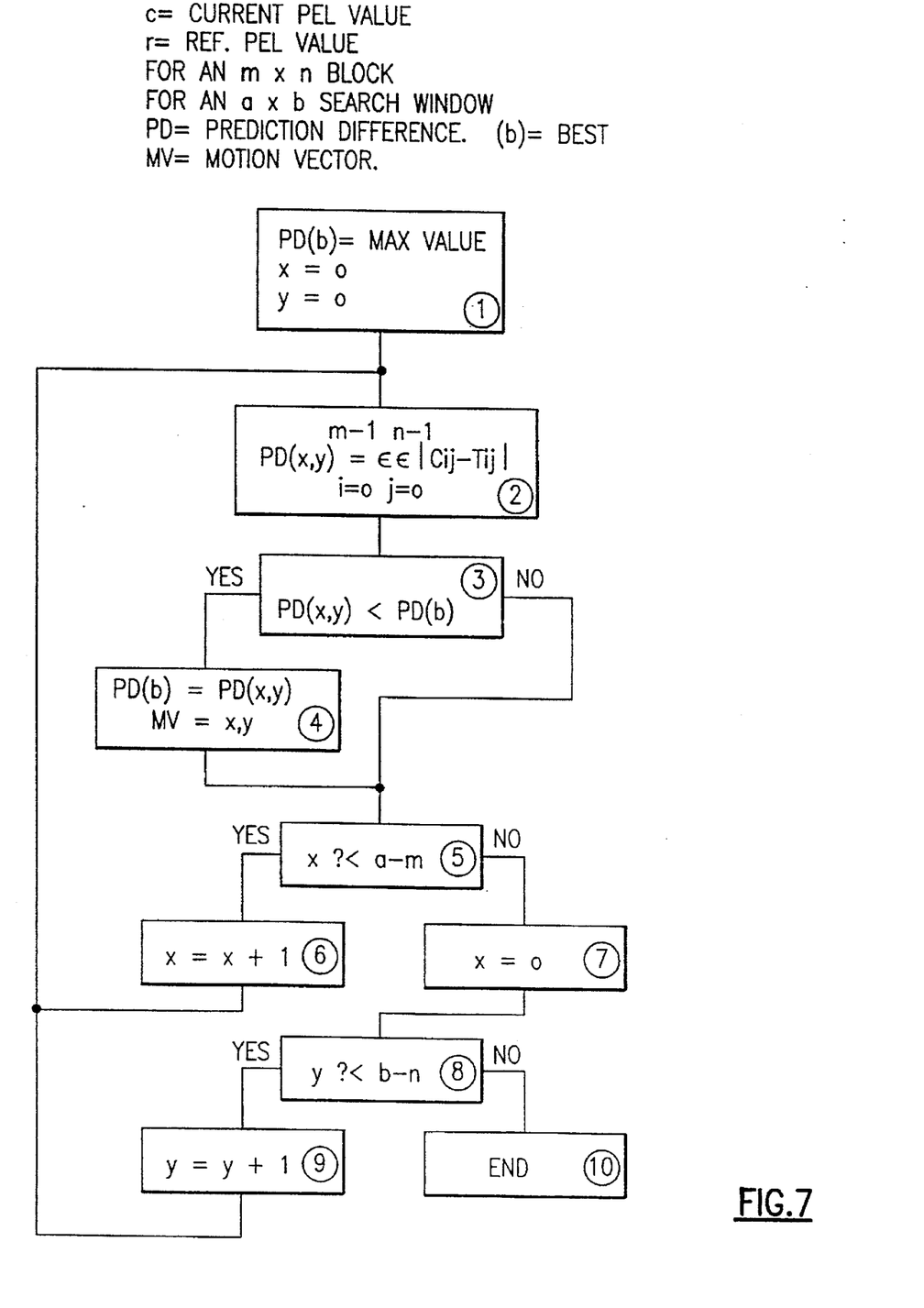
FIG. 7 is a flow chart of how the search for the best match macroblock is carried out. In this flow chart, for an mxn macroblock, and an axb search window, c is the current pixel value, r is the reference pixel value, PD is the prediction difference, PD(b) is the best value of the prediction difference, and MV is the motion vector.

FIG. 7 is a flow chart of how the search for the best match macroblock is carried out. In this flow chart, for an mxn macroblock, and an axb search window, c is the current pixel value, r is the reference pixel value, PD is the prediction difference, PD(b) is the best value of the prediction difference, and MV is the motion vector. Block 1, the PB(b) initialized to the Maximum Value, x initialized to 0, and y initialized to 0, is an initialization block. Block 2, with the summation $$PD(x,y) = \sum_{i=0}^{m-1} \sum_{j=0}^{n-1} |c_{i,j} - r_{i,j}|$$

calculates the sum, over i from 0 to m-1 and j from 0 to n-1, i.e., the size of the macroblock, of the prediction difference.

Block 3 tests to see whether the prediction difference is less then the best found so far, that is, the prediction difference. If so, then the prediction difference is set to the newly calculated value and the motion vector is set to x,y, as illustrated in block 4. There is then a test, in block 5, of x? <a−m. If so, x is incremented, as shown in block 6, and the new value of x is returned to the summation in block 2. If not, x is set to 0 in block 7, the test y ? <b−n is carried out as per block 8. If the test in block 8 is true, y is incremented, in block 9, and the new value of y returned to the summation in block 2. Otherwise the algorithm is ended.

According to the method and apparatus of the invention, the average motion vectors and base weights can be calculated by the on chip circuitry of the encoder or by microcode, and different initial base weights can be set into the circuitry or microcode. Let x be the horizontal offset of the current macroblock from the left edge of the search window, and y be the vertical offset of the current macroblock from the top edge of the search window. When this pair of x and y values are used as the initial base weights, the motion estimation will provide the best matched macroblock that has the shortest distance from the current macroblock. When the initial base weights are set to 0's, then the motion estimation will produce the first best matched macroblock encountered by the search circuitry. When the initial base weight is set to the average motion vector, motion estimation produces the best match macroblock closest to the original motion vector.

While the invention has been described with respect to certain preferred embodiments and exemplifications, it is not intended to limit the scope of the invention thereby, but solely by the claims appended hereto.

We claim:

1. In a method of motion compensation of a digital video motion picture scene where a set of motion vectors are formed defining the differences in displacement between a best match reference macroblock in a previous picture and the respective macroblocks in a current picture, the improvement comprising the steps of:

defining a motion trajectory value equal to the average of the motion vectors for all of the macroblocks in the previous picture, said previous average motion vector having orthogonal x and y components;

defining an absolute pixel difference; and defining zero-valued or positive-valued base weights as a function of the previous average motion vector and the size of a search window, the values of said base weights at a position corresponding to the origin of the previous average motion vector being zero.

2. The method of claim 1 comprising the step of adjusting the base weights while searching for a best match macroblock by moving through the search window and adding the base weights to the absolute pixel difference, whereby the best match macroblock will be the macroblock having the shortest distance from the current macroblock when more than one macroblock has a best prediction difference, when the average motion vector is equal to the search window size and the first best match macroblock encountered by the search when the base weights are zeros.

3. The method of claim 1 wherein the motion trajectory value is the previous average motion vector.

4. The method of claim 1 comprising the step of decrementing the base weights to zero, and thereafter incrementing the base weights.

* * * * *